UNITED STATES PATENT OFFICE.

KARL JEDLICKA, OF BASLE, SWITZERLAND, ASSIGNOR TO THE SOCIETY OF CHEMICAL INDUSTRY IN BASLE, OF SAME PLACE.

YELLOW ACRIDIN DYE AND PROCESS OF MAKING SAME.

SPECIFICATION forming part of Letters Patent No. 666,096, dated January 15, 1901.

Application filed September 4, 1900. Serial No. 28,976. (Specimens.)

*To all whom it may concern:*

Be it known that I, KARL JEDLICKA, chemist and doctor of philosophy, a citizen of the Swiss Republic, and a resident of Basle, Switzerland, have invented a new Yellow Dyestuff and a Process for its Manufacture, of which the following is a clear and complete specification.

The present invention rests upon the observation that the yellow dyestuffs of the acridin series, called "acridin-yellow" and "benzoflavin" and corresponding to the formulæ

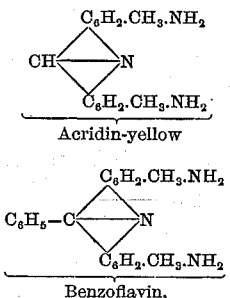

react with alkylating agents in two different manners. This difference of reaction finds its explanation in the constitution of the said amidoacridins, which can be alkylated, on the one hand, in the amido groups and, on the other hand, at the acridin nitrogen. In the first case alkylamidoacridins of the formula (a) 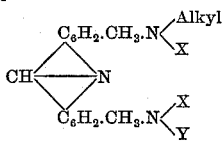

(in which X and Y stand for hydrogen or an alkyl radical) are obtained, while in the latter case derivatives of acridinium of the formula (b) 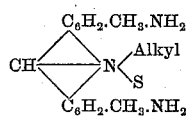

(in which S indicates a residue of an acid, as Cl, $SO_2{<}{\genfrac{}{}{0pt}{}{OH}{O}}$, &c.) are obtained.

Alkylamidoacridins, corresponding to the formula $a$, are formed always and almost exclusively by heating amidoacridins with alcohols in the presence of a mineral acid—that is to say, by alkylating in an acid solution. Accordingly, the alkyl derivatives of acridin-yellow and of benzoflavin, prepared by the process of Letters Patent No. 537,723 by alkylating by means of a mixture of alcohol and mineral acid, range in this group. Combinations of the type $b$ are, on the contrary, formed by treating amidoacridins with alkylating agents in a neutral or weakly-alkaline medium in total absence of acids. Herewith alkylation occurs almost exclusively at the acridin nitrogen. As alkylating agents the ethereal salts of alphylsulfonic acids, as ethereal salts of paratoluenesulfonic acid, ($C_6H_4.CH_3.SO_2O$—alkyl,) ethereal salts of benzenesulfonic acid, ($C_6H_4.SO_2.O$—alkyl,) &c., and the alkyl halides may be employed advantageously for carrying out the reaction. The employ of alkyl halides for alkylating amidoacridins has already been indicated in Letters Patent No. 537,723. In fact, the coloring-matter, known under the name "patentphosphin GG" and prepared according to the process of the said patent from acridin-yellow and ethyl chlorid, contains notable quantities of the corresponding ethylacridinium derivative. The isolation of the ethylacridinium derivative from the commercial "patentphosphin GG" will be fully described hereinafter by way of an example.

The coloring-matters obtained, which dye tannin mordanted cotton in pale-yellow shades, are chiefly distinguished from the parent materials (acridin-yellow and benzoflavin) and from the compounds characterized by the formula $a$ by their behavior in presence of alkalies. Their salts show, in fact, the characteristic property of ammonium bases, as they are not decomposed by bicarbonates, sodium carbonate, or ammonia. An addition of these reagents to an aqueous solution of the coloring-matters produces neither a change in the color of the solution nor a precipitate of the color base. Only by addition of caustic soda is the corresponding acridinium base precipitated. The parent materials and the dyestuffs of the formula $a$ are, on the contrary, already completely decomposed by bicarbonates.

The preparation of these new products will be well understood by the following examples:

Example I: Twenty parts patentphosphin GG, prepared according to the process of Letters Patent No. 537,723 by alkylating acridin-yellow by means of ethyl chlorid, are dissolved in about five hundred parts of water. To the boiling solution is added sodium carbonate or ammonia until the solution is distinctly alkaline, and the hot solution is then filtered. The matter on the filter is boiled several times with water, and from the reddish-yellow filtrates, which contain the acridinium derivative and have been previously mixed, the coloring-matter is precipitated by an addition of common salt or sodium nitrate. When dry, it is an orange-yellow to red-brown powder, easily soluble in water to a yellow and intensely yellow-green fluorescent solution. Ammonia or sodium carbonate does not change the hot aqueous solution of the coloring-matter, while caustic soda precipitates the color base after a short time. The coloring-matter dyes tannin mordanted cotton in yellow to reddish-yellow shades of great purity. The constitutional formula of the coloring-matter might be

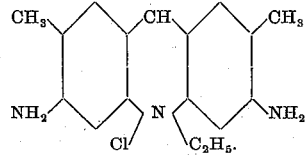

Example II: Twenty parts of "acridin-yellow" as base are dissolved with aid of heat in sixty parts of nitrobenzene, and nineteen parts of methyl-para-toluene-sulfonate are added. The mixture is heated during about fifteen minutes at 120° to 140° centigrade. When cold, the products become a thick magma of brown crystals, which represent the paratoluenesulfonate of the acridinium derivative. These are separated by a filter-pump, washed with benzene, digested with diluted caustic soda, and the color base is separated by filtration. This color base is then dissolved in diluted hydrochloric acid. The hot solution is made weakly alkaline with sodium carbonate or ammonia in order to precipitate the unattacked acridin-yellow and filtered before cooling. From the fitrate the coloring-matter is precipitated by adding common salt or sodium nitrate. In dry state it is a yellow-orange to brownish-yellow powder, which dissolves easily in water to a yellow intensively yellow-green fluorescent solution. Its hot aqueous solution is not changed by addition of sodium carbonate or ammonia. An addition of caustic soda to the aqueous solution precipitates the color base as yellow flocks. In concentrated sulfuric acid of 66° Baumé the coloring-matter dissolves with pale-yellow coloration and yellow-green fluorescence. It dyes tannin, mordanted cotton, and leather yellow to reddish-yellow shades. The tints on cotton are characterized by their great purity and their fastness to alkalies.

The constitutional formula of the coloring-matter might be

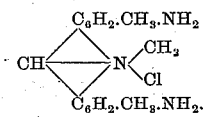

It is consequently diamidoditolylmethylacridinium.

If in the foregoing example acridin-yellow be replaced by benzoflavin, an analogous coloring-matter is obtained, which also dyes mordanted cotton yellow and the solutions of which have the property of becoming gelatinous on cooling.

If instead of the ethereal salts of paratoluenesulfonic acid methyl chlorid be employed as alkylating agent, it is necessary to work in an autoclave under pressure. In this case the nitrobenzene can be replaced by ordinary alcohol. The product obtained is identical with the coloring-matter obtained according to the Example II.

What I claim is—

1. The process for the manufacture of derivatives of the "acridinium" series of the general formula

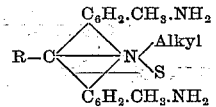

(R signifying hydrogen or phenyl, methyl, &c., and S a radical of an acid as Cl, $SO_2{\Large<}{}^{OH}_{O}$, &c.,) by treating amidoacridins with alkylating agents in total absence of acids.

2. As a new product, the new class of yellow dyestuffs of the acridinium series, which can be obtained by alkylating amidoacridins in the acridin nitrogen, and which are not precipitated from their aqueous solutions by the addition of sodium carbonate or ammonia.

3. As a new article of manufacture the yellow dyestuff, obtained by alkylating acridin-yellow, corresponding probably to the formula

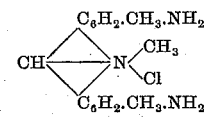

forming an orange to brownish-yellow powder, easily soluble in water to a yellow intensively green fluorescent solution, which is not changed on addition of sodium carbonate or ammonia, but gives a precipitate by addition of caustic soda, difficultly soluble in cold, more easily soluble in hot alcohol, insoluble in ether and benzene, soluble in concentrated sulfuric acid of 66° Baumé with a light-yellow
5 color and greenish-yellow fluorescence and producing on mordanted cotton yellow shades of great fastness to alkalies, substantially as described.

In witness whereof I have hereunto signed my name this 17th day of August, 1900, in the 10 presence of the subscribing witnesses.

KARL JEDLICKA.

Witnesses:
 CLARENCE GIFFORD,
 GEO. GIFFORD,
 T. PLATNAR,
 AMAND RITTER.